United States Patent [19]

Gammons

[11] Patent Number: 4,708,292
[45] Date of Patent: Nov. 24, 1987

[54] FOAM DISPENSING GUN WITH IMPROVED MIXING CHAMBER

[75] Inventor: Robert C. Gammons, Southington, Conn.

[73] Assignee: Olin Corporation, Cheshire, Conn.

[21] Appl. No.: 741,508

[22] Filed: Jun. 5, 1985

[51] Int. Cl.[4] .............................................. B05B 7/02
[52] U.S. Cl. .................................... 239/414; 239/600
[58] Field of Search ............... 239/304, 307, 390, 414, 239/123, 600, 527, 426, 433, 528, 415; 222/129, 145

[56] References Cited

U.S. PATENT DOCUMENTS

| 3,263,928 | 8/1966 | Gusmer | 239/123 |
|---|---|---|---|
| 3,299,939 | 1/1967 | Marra | 239/415 |
| 3,622,669 | 11/1971 | Woods | 239/307 |
| 3,633,795 | 1/1972 | Brooks | 222/134 |
| 3,670,967 | 6/1972 | Fahlin et al. | 239/600 X |
| 3,784,110 | 1/1974 | Brooks | 239/304 |
| 3,920,188 | 11/1975 | Price | 239/403 |
| 3,949,905 | 4/1976 | Nikolov et al. | 222/146 HE |
| 4,023,733 | 5/1977 | Sperry | 239/112 |
| 4,073,664 | 2/1978 | Zwirlein | 134/18 |
| 4,083,474 | 4/1978 | Waite et al. | 222/145 |
| 4,123,007 | 10/1978 | Gardner | 239/414 |
| 4,129,231 | 12/1978 | Larson | 222/145 |
| 4,169,545 | 10/1979 | Decker | 222/136 |
| 4,193,546 | 3/1980 | Hetherington et al. | 239/390 X |
| 4,252,255 | 2/1981 | Henderson | 222/135 |
| 4,311,254 | 1/1982 | Harding | 222/145 |
| 4,325,513 | 4/1982 | Smith et al. | 234/528 X |
| 4,344,919 | 8/1982 | Kelterbaum | 422/133 |
| 4,377,256 | 3/1983 | Lommette et al. | 239/600 X |
| 4,427,153 | 1/1984 | Schaefer | 239/600 X |
| 4,428,530 | 1/1984 | Chabria | 239/527 X |
| 4,469,251 | 9/1984 | Sperry et al. | 222/135 |

Primary Examiner—Duane A. Reger
Assistant Examiner—Kevin Patrick Weldon
Attorney, Agent, or Firm—Ralph D'Alessandro; Thomas P. O'Day

[57] ABSTRACT

In a plural component foam dispensing apparatus there is provided an easily removable and replaceable combination nozzle-mixing chamber that is formed of a low friction, slightly deformable material with a first front contact surface against which is applied force to load the second rear contact surface against the contact surface of the nozzle seat to securely hold the combination nozzle-mixing chamber in place. The core of the combination nozzle-mixing chamber is not axially restrained on each end.

29 Claims, 6 Drawing Figures

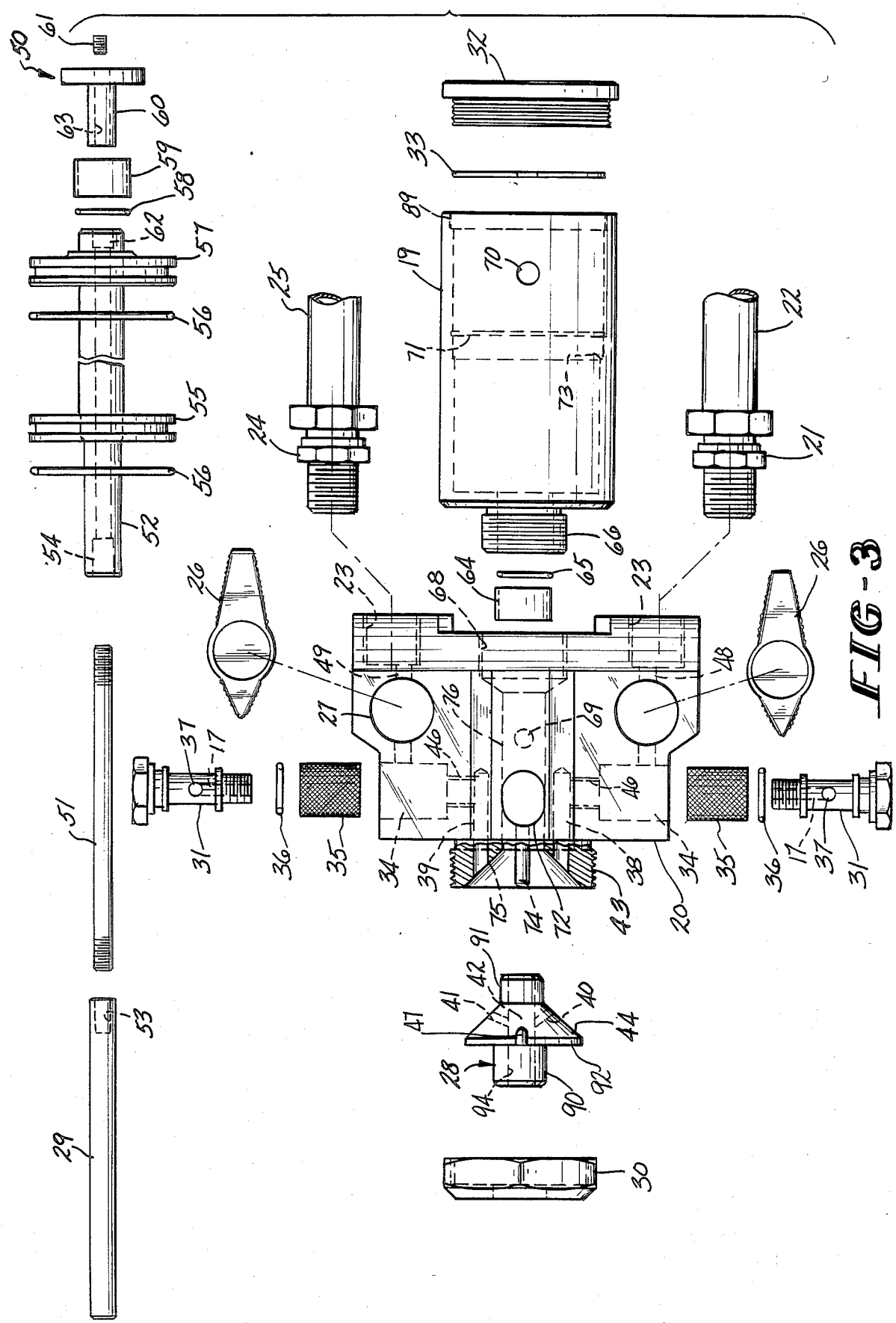

FOAM DISPENSING GUN WITH IMPROVED MIXING CHAMBER

BACKGROUND OF THE INVENTION

The present invention relates generally to apparatus used to dispense a plurality of liquids through a single orifice, and more particularly, to the dispensing gun and removable mixing chamber used to dispense the chemical reactants required to form polyurethane foams.

Polyurethane foams are formed by the reaction of an isocyanate component and hydroxyl-bearing compounds. When mixed in the presence of a catalyst and other additives, such as a polyether resin, a surfactant, a catalyst, and a blowing agent, these chemicals react to form cross-linked polymer chains, more commonly known as a polyurethane. Each of these components of the plural component material, by itself, is generally stable. Thus, each component will not cure or cross-link for extended periods of time, often as long as several months, if they are properly stored. However, when the isocyanate component and the chemical polyol component, a preformulated compound formed from the aforementioned resin, surfactant, catalyst and blowing agent, are mixed together in proper concentrations, an exothermic chemical reaction of the isocyanate and polyol occurs. This reaction causes a continued expansion that is evidence of the polymerization and manifests itself as foam which cross-links and cures. The cross-linking and curing usually is substantially completed in a matter of seconds.

Polyurethane foam dispensers are well known and have achieved a high degree of usage in factories where components must be adhesively lined with an insulating foam or where products must be packaged and protected from damage during shipment. This high level of use of polyurethane foam dispensing equipment has also focused attention on the efficiency of prior apparatus employed to accomplish this dispensing. Many of the problems with foam dispensing equipment stem from the fact that the polyurethane foam "sets" or builds up in the dispenser, normally within the mixing chamber or the nozzle, after the chemical components have cross-linked and begun to cure. This "setting" can eventually cause the apparatus to become inoperative due to clogging or blockage of the flow passages.

In operations such as those required during packaging, where intermittent use of the dispensing apparatus is required, the "setting" problem is more severe. This typically occurs in the situation where a packer initially directs a "shot" of the mixed plural components into the bottom of a container, inserts a polyethylene strip over the top, and places the product to be shipped in the container. Another sheet of polyethylene is placed on top of the product, and the foam dispensing apparatus is then activated after a delay of 10 to 20 seconds from the time the first "shot" was dispensed to fill the box with the cushioning foam. This procedure is repeated for each item to be packed.

Prior foam dispensing apparatus has attempted to solve this "setting" problem by using either separately or combinatively air blasts, cleaning rods or plungers with scrapers, or solvent to remove the residue foam from the dispensing assembly. Specific polyurethane foam systems have attempted to use air with pressurized solvent blown into the mixing chamber and the dispensing nozzle, an automatic solvent flush that runs through the mixing chamber and dispensing nozzle, a blast of purging gas preceding the continuous pumping of solvent through the mixing chamber and dispensing nozzle, and reciprocating cleaning rods or plungers which may or may not use the solvent to facilitate the scraping or residue foam from the dispensing apparatus.

The use of a combination cleaning rod and valving rod to control the flow of the polyol and isocyanate components has proven to be the most common design employed in commercial applications. Since most of the clogging from foam buildup occurs within the mixing chamber or nozzle, designs have evolved employing removable mixing chambers and dispensing nozzle members.

Some designs have employed levers which permit the nozzle to be removed from the dispensing gun. Once these components are removed from the dispensing guns, they are frequently soaked in solvent to reduce or remove the residue foam. The solvent, however can attack gaskets or O-ring seals in the components and ruin the tight seals necessary.

Other designs have employed a TEFLON ® core in the mixing nozzle to overcome cold forming problems that typically result when the core material gradually changes shape under loading to reduce the stress. Cold forming problems affect the tight sealing necessary in interference fittings with the valving rods, thereby permitting the leakage of the isocyanate and polyol components The mixing nozzle is restrained at each end of the core in both an axial and a radial direction. Another design has employed a detachable mixing chamber and a valving rod as one integral unit.

All of these units with removable mixing chambers suffer from the deficiency of having mixing chambers that are large and costly, or which require the disposal of both the mixing chamber and the valving rod should failure of one component occur. The use of metal parts in the mixing chamber to axially and radially restrain the TEFLON ® core at each end, as has been done in one design, also has increased the cost of the foam dispensing apparatus and, specifically, the removable mixing chambers.

These problems are solved in the design of the present invention by providing in a plural component dispensing assembly a removable mixing chamber and a valving rod that are separable and which both may be formed of a low friction plastic which is easily discardable.

SUMMARY OF THE INVENTION

It is an object of the present invention to provide an easily removable and easily replaceable mixing chamber in a plural component dispensing assembly.

It is another object of the present invention to provide a plural component dispensing assembly which permits the mixing chamber and the valving rod to be replaced separately.

It is still another object of the present invention to employ a plural component dispensing assembly which utilizes a low friction plastic for both the mixing chamber and the valving rod.

It is a feature of the present invention that the combination nozzle-mixing chamber has a first contact surface near the front end and a second contact surface near the rear end, the second contact surface fitting together with the contact surface of the nozzle seat and being held securely in place thereagainst when force is applied to the first contact surface.

It is another feature of the present invention that the removable and easily replaceable mixing chamber is frusto-conically shaped and connects a first cylindrical portion and a second cylindrical portion of the dispensing nozzle.

It is still another feature of the present invention that the combination mixing chamber-nozzle is located in the front of the plural component dispensing assembly and is retained in place in a frusto-conically shaped nozzle seat by a pressure applying screw-on nozzle cap.

It is yet another feature of the present invention that an easily removable screw cap applies force to only the first contact surface of the combination nozzle-mixing chamber.

It is an advantage of the present invention that the combination mixing chamber-nozzle is low cost and easily removable and replaceable.

It is another advantage of the present invention that the plural component dispensing assembly is light weight and small in size.

It is yet another advantage of the present invention that the valving rod is separate from the mixing chamber and may be changed separately or in combination with the mixing chamber, as necessary.

It is still another advantage of the present invention that there are no seals used in the mixing chamber body.

It is a further advantage of the present invention that the combination nozzle-mixing chamber is slightly deformable.

These and other objects, features and advantages are obtained in the removable and replaceable combination nozzle-mixing chamber in a plural component dispensing apparatus that has a first front contact surface and a second rear contact surface, the second rear contact surface mating with the contact surface of the nozzle seat and being securely held in place thereagainst by a loading force applied to the first front contact surface, the combination nozzle-mixing chamber being formed of a low friction material.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 3 is an exploded top plan view of the plural component dispensing apparatus;

DETAILED DESCRIPTION OF THE PREFERRED EMBODIMENT

Figure 1:
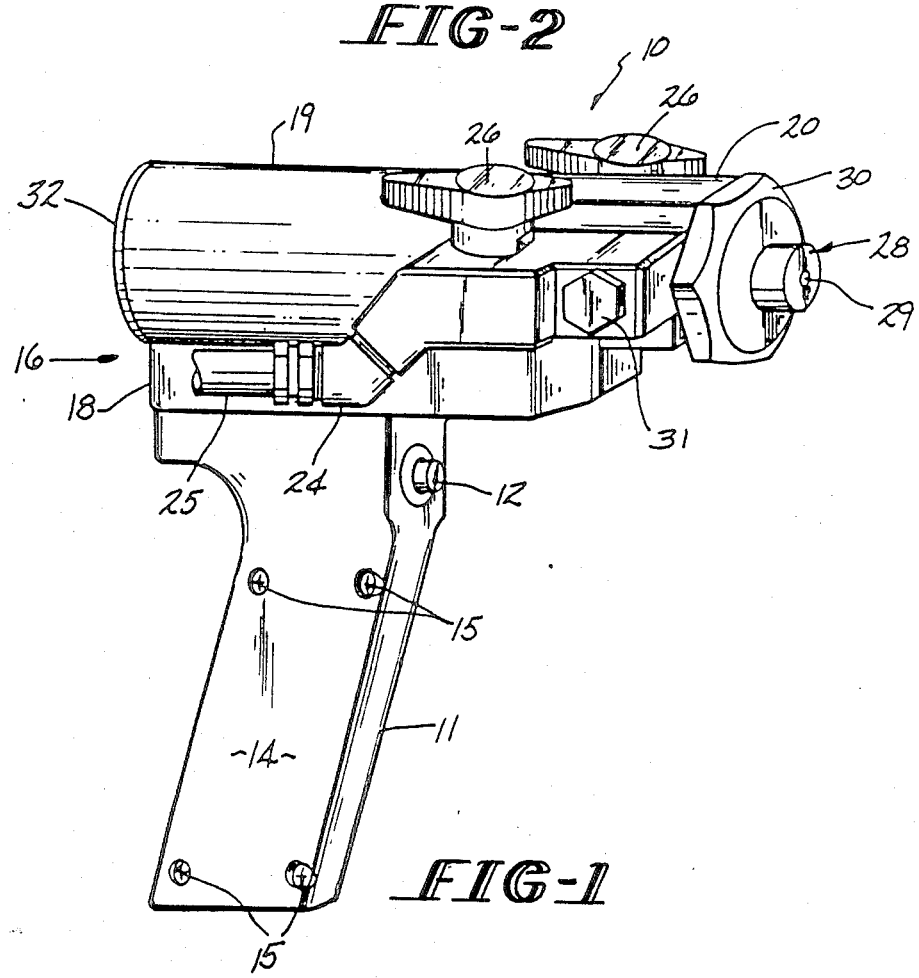
FIG. 1 is a side perspective view of the plural component dispensing apparatus with one of the fluid component hoses partially shown.

FIG. 1 shows the side perspective view of a plural component dispensing assembly, indicated generally by the numeral 10. Assembly 10 consists of a grip handle 11 and an upper gun portion, indicated generally by the numeral 16. Handle 11 has a trigger 12 which may be an electric trigger switch or an air spool type of a trigger switch to activate the internal mechanisms within the assembly 10 to permit the flow of plural components. Handle side covers 14 may be attached to the handle 11, such as by means of handle side cover retaining screws 15. The handle 11 is appropriately secured to the base 18 of the upper gun portion 16, such as with bolts or mechanically interlocking parts.

The upper gun portion 16 has a cylinder 19 threaded into a valve block 20. A polyol component fitting 24, with the polyol fluid hose 25 (partially shown), feeds into the valve block 20 to supply one of the plural components to the assembly 10. The polyol component passes from the fitting 24 through flow passages in the valve block 20 that will be described in greater detail hereafter. A plug or shutoff valve 26 seen in FIG. 1, as well as a filter plug cap 31, are used in the polyol component feed path for purposes that will be described in greater detail shortly with reference to FIG. 3. Comparable structures exist on the opposite side of the assembly 10 for the isocyanate fluid component. The nozzle, indicated generally by the numeral 28, is shown protruding through the end of a nozzle retaining cap 30, which is screwed into place to retain the nozzle 28 in position. A valving rod 29 is partially seen extending through the nozzle in FIG. 1. The cylinder 19 has an end closure cap 32.

Cylinder 19 has a main body that is generally cylindrical with a diameter size that can be selected according to the task to be performed and the foam output desired. Similarly the diameter of the valving rod 29 and the length of the nozzle 28 can also be varied. As seen in FIG. 3, cylinder 19 has a threaded portion 66 which fits within internally threaded valve block recess portion 68. A rod bushing 64 and seal 65 are press fitted within the threaded portion 66 of cylinder 19. Once thus threaded into the recess portion 68, the cylinder 19 is fastened to the valve block 20.

Cylinder 19 has a piston assembly, indicated generally by the numeral 50, that fits inside. Piston assembly 50 is pneumatically driven and includes a hollow cylinder shaft 52 into which fits the retaining rod 51. Retaining rod 51 is threaded into the internally threaded recess 53 of the valving rod 29 on one end of the retaining rod 51. The other threaded end of retaining rod 51 threadingly engages the internally threaded stem portion 63 of the lock knob 60 after passing through hollow cylinder shaft 52. Shaft 52 has a recessed portion 54 which permits the valving rod 29 to seat therein on the opposite end from the lock knob 60.

An O-ring seal 56 fits in the groove in the generally circular piston 55, which is press fitted onto the hollow cylinder shaft 52. O-ring 56 forms the piston seal with the arcuate interior of cylinder 19. Another O-ring seal 56 fits in the groove in the cylinder rear end cap 57 that assembles about the hollow cylinder shaft 52 at the rear of the shaft 52. A smaller O-ring seal 58 fits over the rear portion of the hollow cylinder shaft 52 and has a rear bushing 59 placed thereagainst. Both the O-ring seal 58 and the bushing 59 fit into a recess (not shown) in the rear end cap 57. The lock knob 60 extends into cylinder shaft receiving recess 62 where it is retained by the rear threaded end of the retaining rod 51 being threaded into the threaded stem portion 63. A set screw 61 threadingly engages the rear threaded end of retaining rod 51 through the lock knob 60 to a desired depth to pressure fit lock knob 60 in position and prevent rotational movement of retaining rod 51.

Thus assembled, the piston assembly 50 fits within the cylinder 19 and extends forwardly with its valving rod 29 and retaining rod 51 into the valve block 20. The piston assembly 50 is retained in position within the cylinder 19 by the combination of the reduced internal diameter 73, seen in FIG. 3, and the snap ring 33. The reduced internal diameter 73 prevents the cylinder rear end cap 57 and the shaft 52 from moving further forward within the cylinder 19 when the shaft 52 is pneumatically reciprocally actuated. The snap ring 33 fits within a snap ring recess 71 within the cylinder 19 and similarly prevents the cylinder rear end cap 57 from moving rearwardly. The end closure cap 32 threadingly engages the end closure cap recess 89 to close the rear of cylinder 19.

Once assembled to the valve block 20, the cylinder 19 can be positioned properly with respect to the handle 20 by means of an allen screw (not shown) that aligns with the clearance hole 70 seen in FIG. 3.

Valve block 20 shows the flow paths of the isocyanate and polyol components from their fluid hose feed lines 22 and 25 into the mixing chamber 42 within nozzle 28. As seen in FIG. 3, the isocyanate fluid feed hose 22 and the polyol fluid feed hose 25 connect to fittings 21 and 24, respectively, to be threadingly inserted within fitting recesses 23 at the rear of the valve block 20. Preferably, fittings 21 and 24 are angled upwardly into the valve block 20 so that the feed lines are displaced slightly downwardly. Once thus connected, the isocyanate component passes into fluid passage 48, while the polyol component passes into the fluid passage 49, enroute to the plug or shutoff valves 26.

Figure 5:
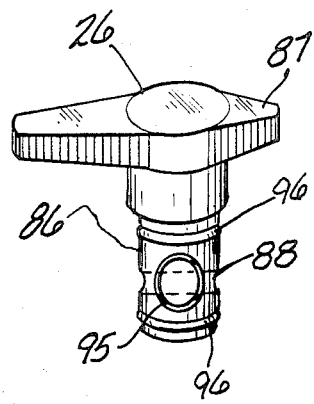
FIG. 5 is a side perspective view of one of the shutoff or plug valves employed in the plural component dispensing apparatus.

As seen in FIG. 5, each shutoff valve 26 comprises a generally cylindrically extending valve stem 86 with a valve flow passage 88 extending therethrough. A shutoff valve cap 87 is securely fastened to the valve stem 86 to permit the valve stem to be rotated so that the flow passage 88 presents a continuous flow passage in line with the isocyanate fluid passage 48 and the polyol fluid passage 49 when flow is desired. When the shutoff of the flow of plural components is desired, the shutoff valve 26 may be turned by means of the valve cap 87 to block the flow from the fluid passages 48 and 49 by misaligning the flow passage. An O-ring seal 95 is mounted in the valve stem 86 to seal off the flow of fluid components when the shutoff of flow is desired. O-ring seals 96 seal the top and the bottom of the valve stem 86.

When the shutoff valves 26 are in the flow or open position, the plural components then flow on each side of the block through a filter screen 35, which fits within filter screen opening 34. The filter screens 35 are retained in place by the partially hollow filter plugs 31, which threadingly engage the filter plug recesses 46. An O-ring 36 provides a seal between the filter plugs 31 and the fluid passages 48 and 49 to prevent leakage. An orifice 37 effects a right angle junction with a flow opening 17 in each filter plug 31 to permit the appropriate plural component to continue its flow through the filter plug 31 into ports 38 and 39.

The polyol component flows into a polyol infeed port 39 upon leaving the filter screen 35 and its associated filter plug 31. Port 39 then feeds directly into the nozzle inlet port 41 of nozzle 28.

On the isocyanate side, the isocyanate component leaves filter screen 35 and its associated filter plug 31 and enters the isocyanate infeed port 38. The isocyanate infeed port 38 connects to the isocyanate nozzle inlet port 40.

A locating pin 74 is press fitted into the valve block 20 to provide an alignment source for the nozzle 28 to ensure that the isocyanate infeed port 38 and the polyol infeed port 39 are properly aligned with the isocyanate nozzle inlet port 40 and the polyol nozzle inlet port 41. This locating pin 74 fits within a pin alignment notch 47 in the frusto-conical contact surface 44 of nozzle 28.

The valve block 20 is secured to the handle 11 by a bolt (not shown) that extends from the handle into a bolt hole 69 seen in FIG. 3 that is in the bottom of the valve block 20. A clearance hole 72 in the top of the valve block 20 permits visual inspections to be made to check for leakage between the valving rod 29 and the nozzle 28.

The nozzle 28 fits within a frusto-conically shaped nozzle seat contact surface 75 that is at the front of the valve block 20. The nozzle 28 and nozzle seat contact surface 75 are aligned with the valving rod passage 76 to permit the valving rod 29 to extend from the valving rod passage 76 through the frusto-conical nozzle seat contact surface 75 into the generally cylindrically shaped bore 94 of the nozzle 28 where the mixing chamber 42 is found. The nozzle cap 30 fits over and about the first cylindrical portion 90 of the nozzle 28 and seats against the larger, generally straight bottomed first contact surface 92 of the nozzle 28. The pressure or loading of the nozzle cap 30 against this first contact surface 92 seats and firmly holds the nozzle 28 and the nozzle's second frusto-conically shaped contact surface 44 in place against the nozzle seat contact surface 75. The nozzle's second frusto-concially shaped contact surface defines the terminus of and is external to the second cylindrical portion 91, while the first contact surface or generally straight bottomed portion 92 defines the terminus of and is external to the first cylindrical portion 90.

Figure 2:
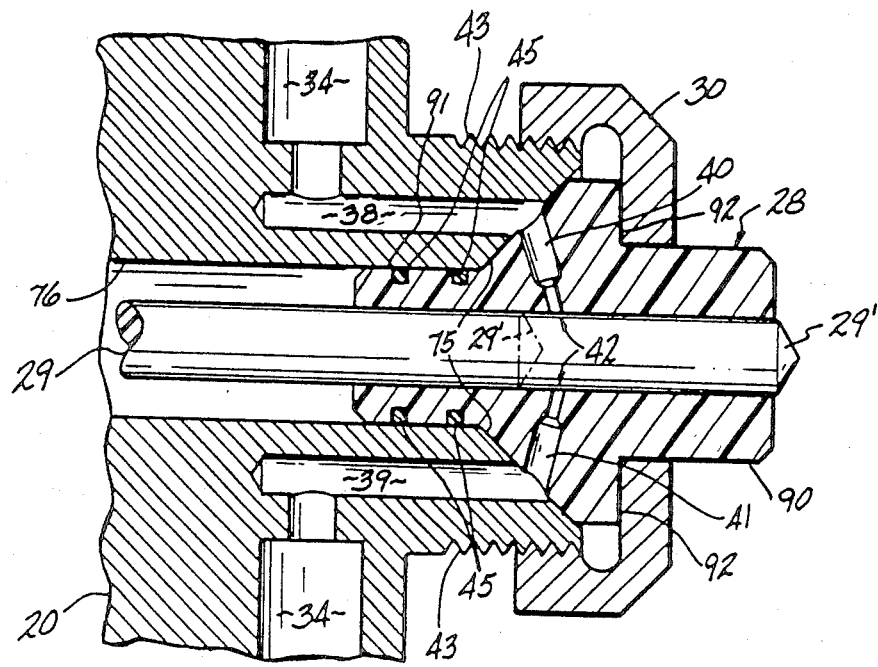
FIG. 2 is an enlarged sectional view of a portion of a valve block and the combination nozzle-mixing chamber.

FIG. 2 shows in enlarged detail the valve block 20 and the fitting of the second contact surface 44 of the nozzle 28 into the nozzle seat contact surface 75 in the valve block 20. In this view there are also shown gasket seals 45 about the second cylindrical portion 91 of the nozzle 28 which may be used. The nozzle cap 30 is seen threadingly engaging the threaded front portion 43 of the valve block 20. The action of the nozzle cap 30 engaging the generally straight bottom portion 92 of the nozzle 98 is clearly seen. By tightening the cap 30, the second contact surface 44 of the nozzle 28 is securely seated within the nozzle seat contact surface 75. The tightening of the screw cap 30 permits any manufacturing imperfections and the loss of any interference fittings between parts, such as those caused by cold forming, to be compensated for by applying additional loading to the nozzle by additional tightening.

FIG. 2 also shows the reciprocating action of the valving rod 29 between an open position where the rod tip 29' is shown in dotted lines to the rear of the isocyanate nozzle inlet port 40 and the polyol nozzle inlet port 41 and a closed position where the rod tip 29' extends out of the nozzle 28. Isocyanate inlet port 40 and polyol nozzle inlet port 41 are shown entering the mixing chamber 42 within the nozzle 28 at an angle to the center line of the valving rod 29 taken in the horizontal plane to effect the impingement mixing of the plural components necessary to produce the polyurethane foam.

Figure 4:
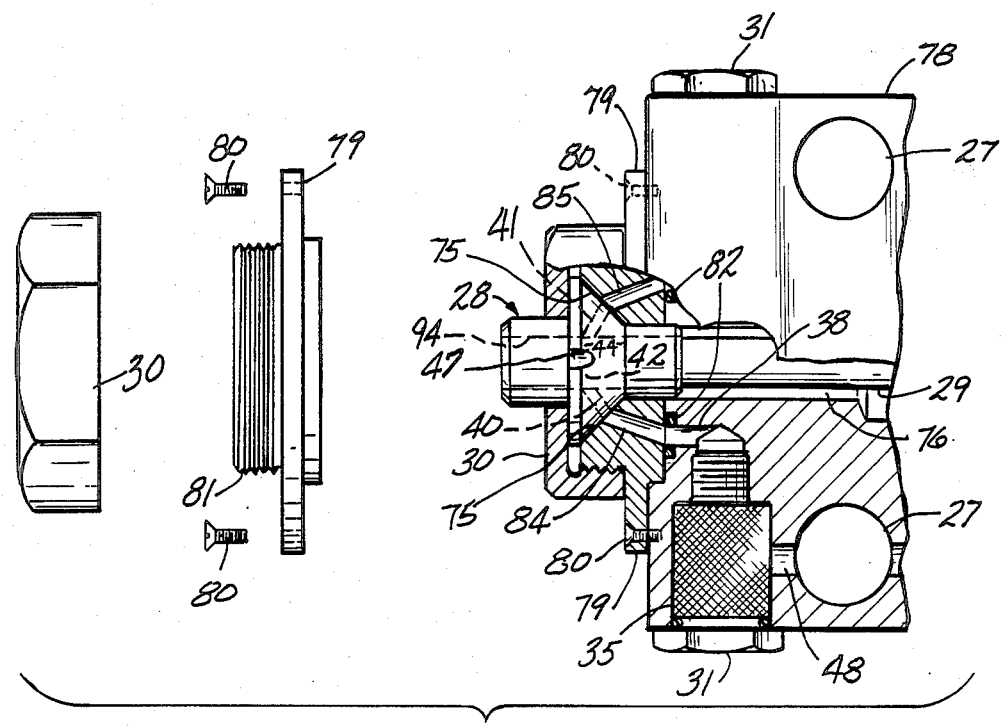
FIG. 4 is an enlarged, partially exploded side elevational view of the valve block of the plural component dispensing apparatus with portions broken away to show the combination nozzle-mixing chamber.

An alternate valve block 78 is shown in FIG. 4 where the nozzle ring 79 with the threaded front portion 81 is detachable from the valve block 78. This is particularly desirable in the event that the threaded portion 81 becomes damaged. The threaded portion 81 then can be changed simply by removing the nozzle ring retaining screws 80, instead of having to dispose of an entire valve block. As seen in FIG. 4 the nozzle ring 79 is fastened into the valve block by the nozzle ring retaining screws 80. The nozzle 28 fits within the nozzle seat contact surface 75 and is held in place, as previously described, by the tightening of the nozzle end cap 30. O-ring seals 82 may be employed for the isocyanate inlet port 40 and the polyol inlet port 41 to prevent leakage.

As seen in FIGS. 2, 3, and 4, the nozzle 28 includes the mixing chamber 42 which is defined by the retraction of the tip 29' of the valving rod 29 rearwardly of the isocyanate and polyol inlet ports 40 and 41, respectively, and the generally cylindrically shaped bore 94. The mixing chamber-nozzle combination employs an external frusto-conically shaped mixing chamber 42 into which the isocyanate nozzle inlet port 40 and the polyol inlet port 41 feed. The mixing chamber 42 with its exteriorly frusto-conically Shaped second contact surface 44, connects the first cylindrical portion 90 with a generally larger diameter to the second cylindrical portion 91 with its generally smaller diameter. A generally cylindrically shaped bore 94 runs the length of the nozzle 28 and includes the mixing chamber 42 in its length.

This shaping of the combination of this mixing chamber-nozzle permits the nozzle 28 to be pressed into the frusto-conically shaped nozzle seat contact surface 75 so that any manufacturing intolerances can be compensated for by the ability of the low friction plastic to be slightly deformable or somewhat change shape. The nozzle 28 with its mixing chamber 42 is made of a low friction plastic or fluoropolymer, preferably of polytetrafluoroethylene such as that sold under the brand name TEFLON ®. The entire nozzle is formed of this material and is therefore low cost and easily replaceable should its inlet ports become clogged with foam or the nozzle otherwise damaged. The cost of a mixing chamber 42 and nozzle 28 of this design is relatively low.

Similarly, the valving rod 29 can be made of a low friction type of plastic or at least a metal coated with a low friction type of plastic or fluoropolymer. A polytetrafluoroethylene plastic, such as TEFLON ®, is also desirable for use as the rod or rod coating in the present invention to permit a low cost and light weight plural dispensing apparatus to be achieved. A valving rod formed or coated with this type of a low friction material has less frictional resistance to reciprocating movement and therefore requires a relatively low rod actuation force and, hence, a smaller cylinder 19 to effect reciprocating movement. As can be seen from FIG. 3, the valving rod 29 is a separate component apart from the mixing chamber 42 and nozzle 28. The replacement of either the valving rod 29 or the combination mixing chamber-nozzle can be accomplished without having to replace both components. Should the nozzle 28 be difficult to remove, the clearance hole 72 can be utilized to facilitate removal once the end cap 30 has been removed.

A plural component dispensing assembly 10 is assembled by mounting a valve block 20 to a handle 11 with appropriate handle covers 14 in place. The valve block 20 has shutoff valves 26 positioned along the flow path of the plural components from their fluid feed hoses 22 and 25, which are connected to the valve block via fittings 21 and 24. Shutoff valves 26 have flow passages 88 in the valve stems 86 to permit the components to continue flowing through the flow passages 48 and 49 into the filter screens 35. Once the plural components have passed through the filter screen 35 they enter the filter plug orifices 37 and continue along flow openings or passages 17 through the partially hollow filter plugs 31. The plural components then pass into the isocyanate infeed port 38 and the polyol infeed port 39 before entering the nozzle 28 through the isocyanate nozzle inlet port 40 and polyol nozzle inlet port 41. The filter plugs 31 are secured, with their filter screens 35 and O-rings 36 within the filter screen openings 34 by the threading engagement of the filter plug recesses 46.

The nozzle 28 is seated within the frusto-conically shaped nozzle seat contact surface 75 by aligning the locating pin 74 with the appropriate locating notch or recess 47 in the frusto-conical section 44 of the nozzle 28 to ensure proper alignment between the plural component infeed ports and nozzle inlet ports. The nozzle cap 30 fits over and about the first cylindrical portion 90 of nozzle 28 and bears against the generally straight bottom portion 92 by being screwed onto the threaded front portion 43 of the nozzle seat. Tightening the cap 30 permits the nozzle 28 and, specifically the nozzle's second contact surface 44 to be sealingly seated within the nozzle seat contact surface 75. The second cylindrical portion 91 of nozzle 28 then extends into the valving rod passage 76.

The cylinder 19 is threadingly inserted within the valve block recess portion 68, after the rod bushing 64 and seal 65 are press fitted within the cylinder threaded portion 66. The piston assembly 50 is then assembled by threading the valving rod 29 onto one end of the retaining rod 51 and passing the other end of the retaining rod 51 through the hollow cylinder shaft 52 until it is threadingly engaged with the internally threaded stem portion 63 of the lock knob 60. Rear bushing 59 and O-ring seal 58 first are inserted into rear end cap 57 with its O-ring seal 56 that is assembled over the hollow cylinder shaft 52. Piston 55, with its additional O-ring seal 56, is press fitted onto hollow cylinder shaft 52. Set screw 61 is threaded into the rear of the lock knob 60 against the rear of retaining rod 51 to pressure fit lock knob 60 in position. The entire piston assembly 50 is then inserted within the hollow cylinder 19 with the valving rod 29 being carefully pushed forward through the valving rod passage 76 into the nozzle bore 94. Rear end cap 57 seats against the reduced internal diameter 73. The snap ring 33 is positioned within the snap ring recess of the cylinder 19 to hold rear end cap 57 in place and the end closure cap 32 is screwed into the end closure cap recess 89 to close the cylinder.

Removal of a clogged or damaged nozzle 28 is effected by removal of the end cap 30 and the sliding out of the nozzle 28 from the nozzle seat contact surface 75. A damaged valving rod 29 can also be removed by unthreading the valving rod 29 from the retaining rod 51 with the nozzle 28 thus removed. Should the valving rod 29 be damaged or broken off internally within hollow shaft 52, the set screw 61 and lock knob 60 may be removed, permitting the retaining rod 51 and the valving 29 to be pushed out of the front of the nozzle 28. The same technique may be used to remove the valving rod 29, retaining rod 51, and the nozzle 28 should the valving rod 29 and nozzle 28 become mechanically locked together, after removal of the end cap 30. If necessary, the entire piston assembly 50 can be removed.

Figure 6:
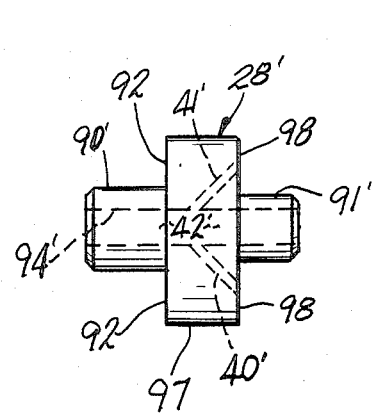
FIG. 6 is a top plan view of an alternative combination nozzle-mixing chamber employable in a plural component dispensing apparatus.

While the preferred structure in which the principles of the present invention have been incorporated is shown and described above, it is to be understood that the invention is not to be limited to the particular details thus presented, but in fact, widely different means and structure may be employed in the practice of the broader aspects of this invention. For example, the first and second cylindrical portions 90 and 91 of the nozzle 28 may be the same diameter, with appropriate corresponding changes being made either to the nozzle end cap 30 or the diameter of the valving rod passage 76. The nozzle could have a flat sided contact surface or surfaces that are flat, such as in a pyramidal design, instead of conical or sloped. Similiarly, the nozzle 28' could be entirely cylindrically shaped, as seen in FIG. 6, where a central cylindrical section 97 connects the first cylindrical portion 90' and the second cylindrical portion 91'. The mixing chamber 42' is located within the central generally cylindrically shaped bore 94'. The first contact surface 92 and the second contact surface 98 function as previously described to seat the nozzle 28' under loading in a nozzle seat that has its nozzle seat contact surface appropriately modified to fit against the nozzle second contact surface 98. Isocyanate and polyol inlet ports 40' and 41' function and are positioned as described previously.

Additionally, it is to be understood that the instant invention may be equally well employed in a hand held or machine mounted dispensing head, the latter having the handle removed.

The scope of the appended claims is intended to encompass all obvious changes in the details, materials and arrangement of parts which will occur to one of skill in the art upon a reading of the disclosure.

Having thus described the invention, what is claimed is:

1. A deformable nozzle in which plural components are mixed for use in a plural component dispensing apparatus and mountable thereto and retained in place by nozzle retaining means having, in combination;
   (a) a central elongate bore;
   (b) a first nozzle portion circumscribing a portion of the bore, the first nozzle portion receiving the nozzle retaining means thereabout such that when the nozzle retaining means is removed from the first nozzle portion the nozzle is removable from the apparatus without further apparatus disassembly;
   (c) a second nozzle portion circumscribing a second portion of the bore;
   (d) a central nozzle portion circumscribing a third portion of the bore having a first contact surface at the terminus of the first nozzle portion that contacts the nozzle receiving means when the apparatus is assembled and an opposing second contact surface at the terminus of the second nozzle portion, the central portion connecting the first nozzle portion and the second nozzle portion, the first contact surface being external to the first nozzle portion and the second contact surface being external to the second nozzle portion, the periphery of the central nozzle portion between the first contact surface and the second contact surface being continuous and uninterrupted; and
   (e) at least two plural component inlet ports in the central nozzle portion extending therethrough and opening into the bore thereby defining at the opening of each inlet port an impingement mixing chamber for the plural components, the plural component inlet ports further being oriented at an angle to the bore in a horizontal plane.

2. The apparatus according to claim 1 wherein the first nozzle portion is generally cylindrical in shape.

3. The apparatus according to claim 2 wherein the second nozzle portion is generally cylindrical in shape.

4. The apparatus according to claim 3 wherein the central nozzle portion is generally continuously frusto-conically shaped.

5. The apparatus according to claim 4 wherein the second contact surface is generally continuously frusto-conically shaped.

6. The apparatus according to claim 3 wherein the central nozzle portion is generally continuously cylindrically shaped.

7. The apparatus according to claim 3 wherein the central nozzle portion has a pin alignment recess therein.

8. The apparatus according to claim 1 wherein the deformable nozzle is formed of a low-friction material.

9. The apparatus according to claim 8 wherein the low-friction material is a fluoropolymer.

10. A plural component dispensing apparatus for dispensing from a front end of the apparatus a foam formed from the impingement mixing of plural components, the dispensing apparatus having an opposing rear end, comprising, in combination:
    (a) a valve block with a hollow valving rod passage centrally positioned therein and flow port means for the fluid flow of the plural components therethrough, the valve block further having a first end adjacent the front end of the apparatus and an opposing second end nearer the opposing rear end of the apparatus than the front end;
    (b) a nozzle seat with a nozzle seat contact surface on a first end of the valve block, the nozzle seat being aligned with and having the valving rod passage extend thereinto;
    (c) an easily removable and deformable nozzle having a first portion and a second portion interconnected by a central portion and having a central, elongate bore extending therethrough aligned with the valving rod passage, the central portion having a first contact surface defining the terminus of the first portion and external thereof and an opposing second contact surface defining the terminus of the second portion and external thereof, the second contact surface further fitting together with the nozzle seat contact surface when force is applied against the first contact surface, the nozzle further being removable from the front end of the apparatus;
    (d) at least two plural component nozzle inlet ports in the central portion extending therethrough and opening into the bore, the nozzle inlet ports conveying the plural components from the flow port means into the bore;
    (e) a valving rod reciprocably movably within the valving rod passage and the bore between a first position extending forwardly of the nozzle inlet ports to shut off the flow of plural components and a second position rearwardly of the nozzle inlet ports to permit the flow of plural components into the bore;

(f) a mixing chamber within the bore of the nozzle defined by the second position of the valving rod and the opening of the nozzle inlet ports into the bore for the impingement mixing of the plural components;

(g) cylinder means connectable to an opposing second end of the valve block to reciprocatingly actuate the valving rod;

(h) plural component supply means to supply at least two plural components to the valve block; and (i) nozzle retaining means removably connectable to the nozzle seat adjacent the front end of the apparatus adjustable to exert a force against the first contact nozzle surface to load the nozzle and the nozzle second contact surface against the contact surface of the nozzle seat to hold the nozzle securely in place, the nozzle retaining means further fitting about the first portion of the nozzle such that when removed the nozzle is removable from the front end of the apparatus without further apparatus disassembly.

11. The apparatus according to claim 10 wherein the nozzle seat further has an alignment pin extending outwardly therefrom.

12. The apparatus according to claim 11 wherein the central portion of the nozzle has a pin alignment recess therein to permit the nozzle to be properly seated within the nozzle seat and aligned with said at least two plural component nozzle inlet ports.

13. The apparatus according to claim 10 wherein the nozzle retaining means is an end cap that screws onto the nozzle seat.

14. The apparatus according to claim 10 wherein the nozzle seat contact surface is generally frusto-conical.

15. The apparatus according to claim 14 wherein the second contact surface is generally frusto-conical.

16. The apparatus according to claim 10 wherein the second contact surface is generally flat and the central portion is generally cylindrical.

17. The apparatus according to claim 16 wherein the nozzle seat is generally cylindrical and the nozzle seat contact surface is generally flat.

18. The apparatus according to claim 10 wherein the first portion of the nozzle is generally cylindrical.

19. The apparatus according to claim 18 wherein the second portion of the nozzle is generally cylindrical.

20. The apparatus according to claim 10 wherein the nozzle is formed from a low friction material.

21. The apparatus according to claim 20 wherein the nozzle is formed from a fluoropolymer.

22. The apparatus according to claim 10 wherein the valving rod is removable from the front end of the apparatus without further disassembly after the nozzle retaining means and the nozzle are removed, the valving rod further being at least coated with a low friction material.

23. The apparatus according to claim 22 wherein the cylinder means further comprises a pneumatically driven piston to which the valving rod is removably connected.

24. The apparatus according to claim 23 wherein the cylinder means further comprises a retaining rod that is removably connectable to the piston and the valving rod.

25. The apparatus according to claim 24 wherein the cylinder means further comprises a hollow shaft about which the piston is mounted and through which the retaining rod is inserted.

26. The apparatus according to claim 25 wherein the retaining rod is removably connected to a lock knob.

27. The apparatus according to claim 26 wherein the cylinder means further comprises an open ended cylinder within which are placed the assembled valving rod, retaining rod, hollow shaft with the piston mounted thereon, and the lock knob.

28. The apparatus according to claim 27 wherein the hollow shaft further has a cylinder rear end cap mounted thereabout between the piston and the lock knob.

29. The apparatus according to claim 28 wherein the open ended cylinder has an end closure cap to close the cylinder.

* * * * *